May 10, 1927.

W. FERRIS

HYDRAULIC TRANSMISSION

Filed July 9, 1921

INVENTOR.
Walter Ferris.
BY
ATTORNEYS.

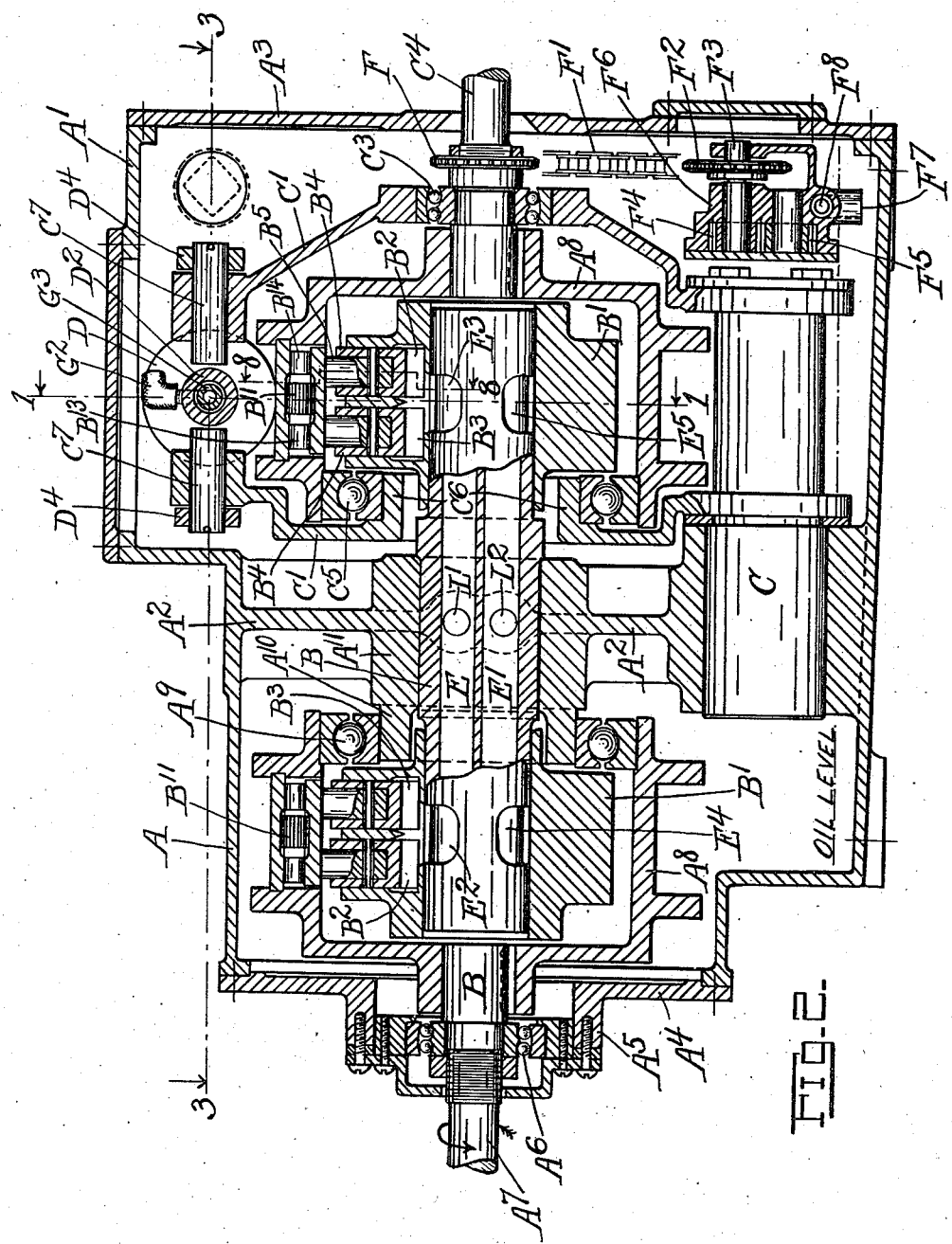

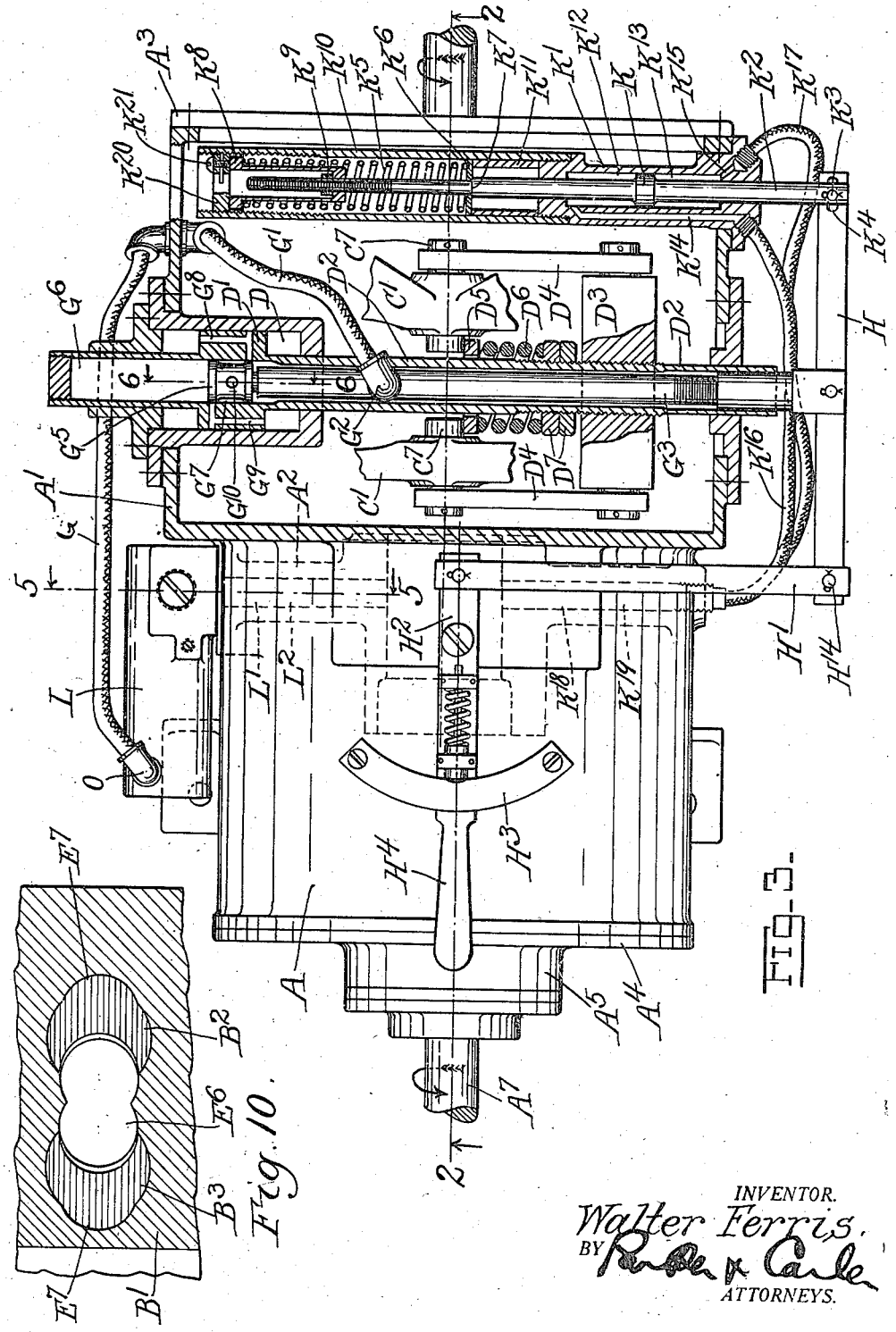

May 10, 1927.  1,628,603
W. FERRIS
HYDRAULIC TRANSMISSION
Filed July 9, 1921   5 Sheets-Sheet 4
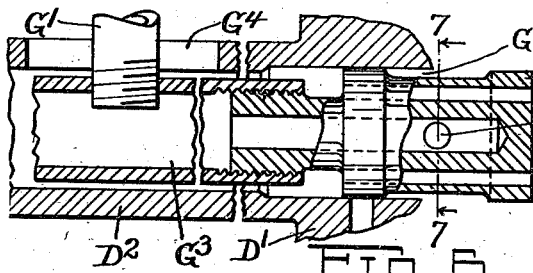
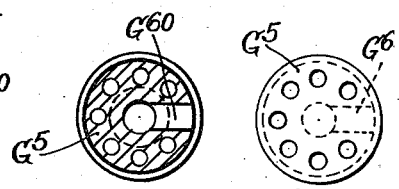
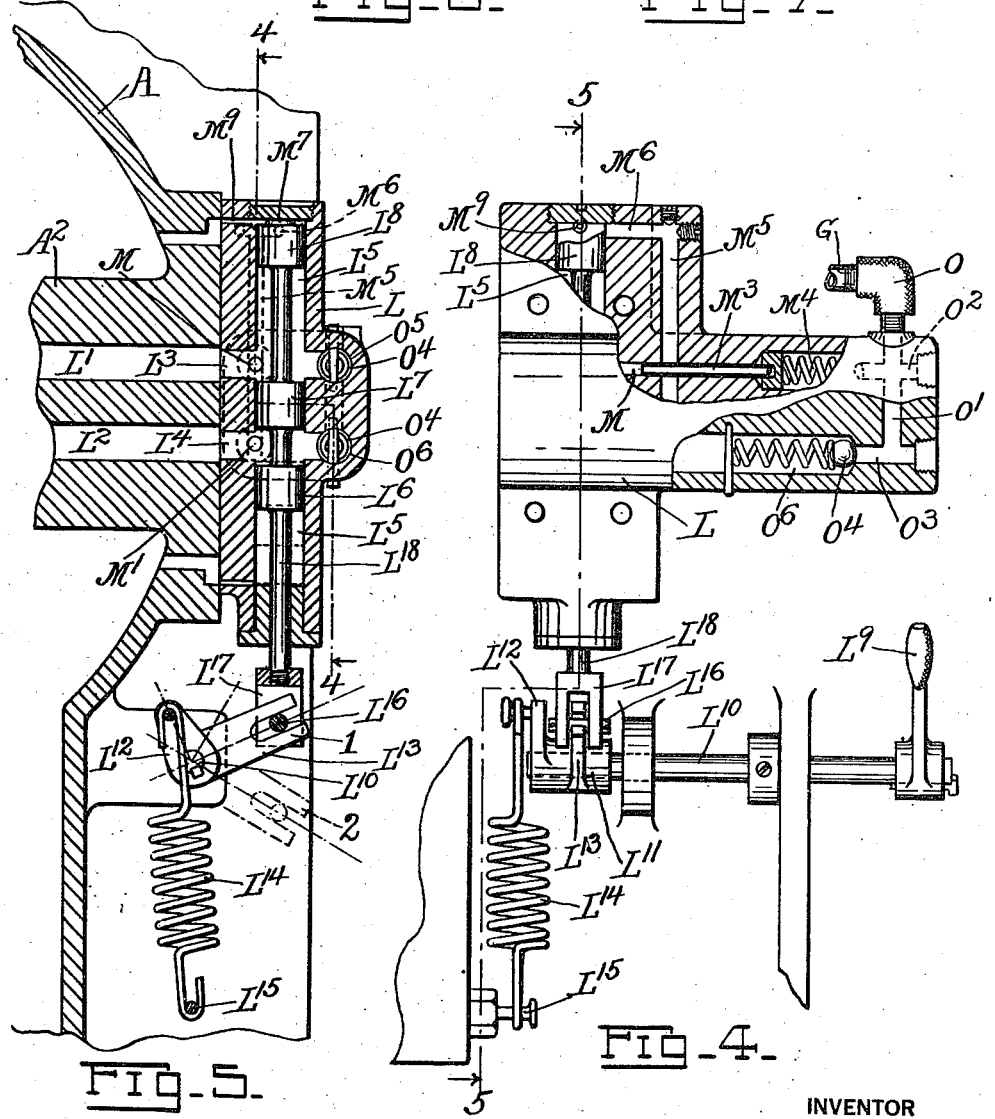
INVENTOR
Walter Ferris
BY
ATTORNEY

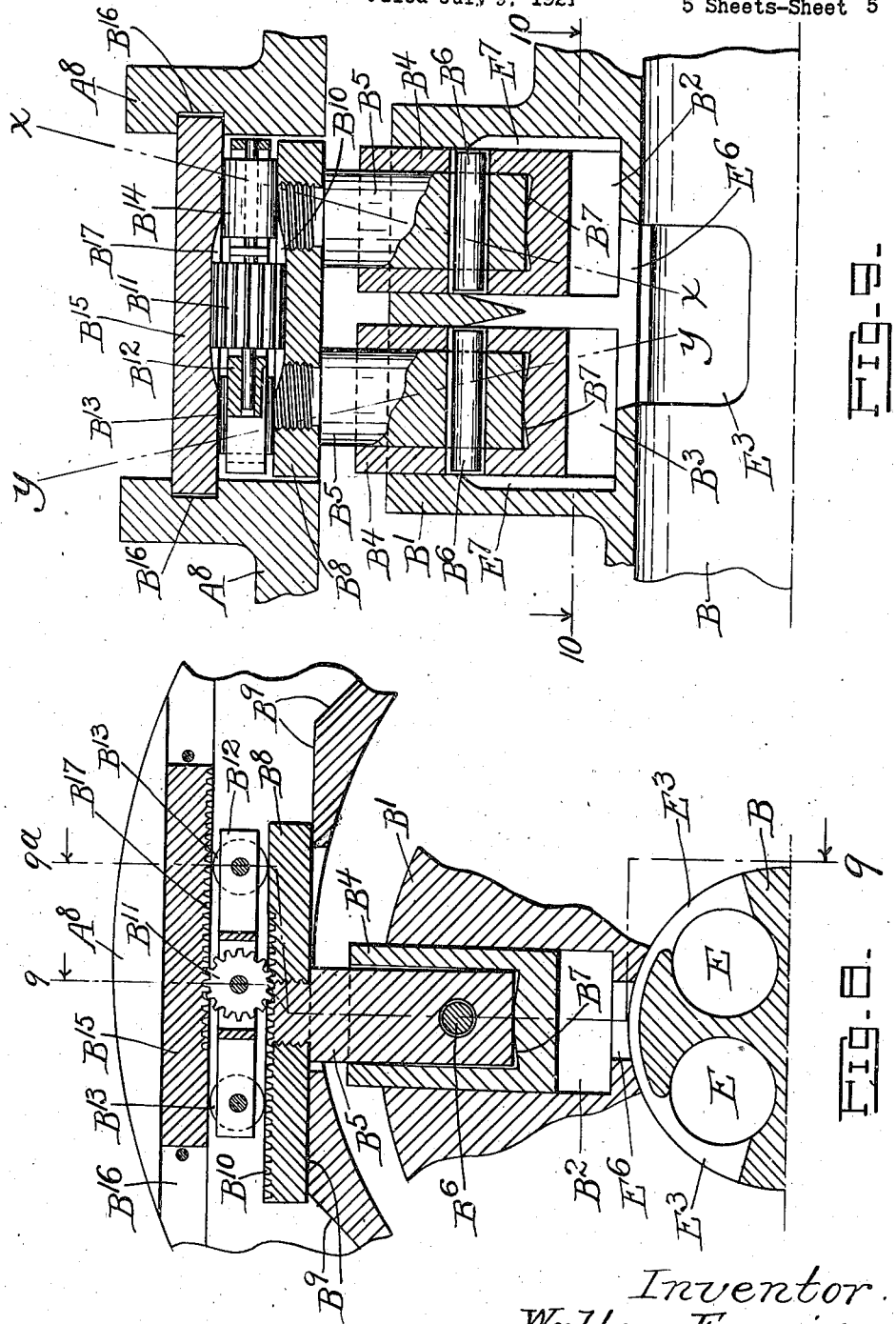

Patented May 10, 1927.

1,628,603

UNITED STATES PATENT OFFICE.

WALTER FERRIS, OF MILWAUKEE, WISCONSIN, ASSIGNOR TO THE OILGEAR COMPANY, OF MILWAUKEE, WISCONSIN, A CORPORATION OF WISCONSIN.

HYDRAULIC TRANSMISSION.

Application filed July 9, 1921. Serial No. 483,468.

This invention relates to hydraulic transmissions, and more particularly to pumps and fluid motors of the rotary, multiple piston type.

It contemplates more especially the provision of a hyraulic system having a motor driven by hydraulic pressure derived from a pump through a closed hydraulic circuit between the pump and motor.

One object of the present invention is to provide means whereby the displacement of the motor or pump, or both, may be conveniently varied with the utmost ease. In the present showing, wherein only one embodiment of the present invention is selected for illustrative purposes, such means are provided to permit a variance in pump displacement only, it being understood that similar means may be employed to vary the stroke of the motor.

A further object is the provision of improved controlling means for the adjustable parts whereby a more efficient and less complicated mechanism is produced.

A still further object is to improve the construction and operation of devices of this character so as to permit the parts to be assembled and disassembled with ease, and to facilitate the removal of separate component parts or groups of parts without disturbing or interfering with the other elements of the machine.

Other more specific objects and advantages will appear from the following description of an illustrative embodiment of this invention.

In the drawings:

Fig. 2 is a sectional view taken substantially along the lines 2—2 of Figs. 1 and 3.

Fig. 3 is a sectional plan view taken substantially along the line 3—3 of Fig. 2.

Fig. 4 is a fragmentary sectional view of the relief mechanism taken substantially along the broken line 4—4 of Fig. 5.

Fig. 5 is a section on the line 5—5 of Figs. 3 and 4;

Fig. 6 is a section along the line 6—6 of Fig. 3;

Fig. 7 is a section along the line 7—7 of Fig. 6;

Fig. 7a is an end view of Fig. 7;

Fig. 8 is a section on the broken line 8—8 of Fig. 2;

Figure 1:
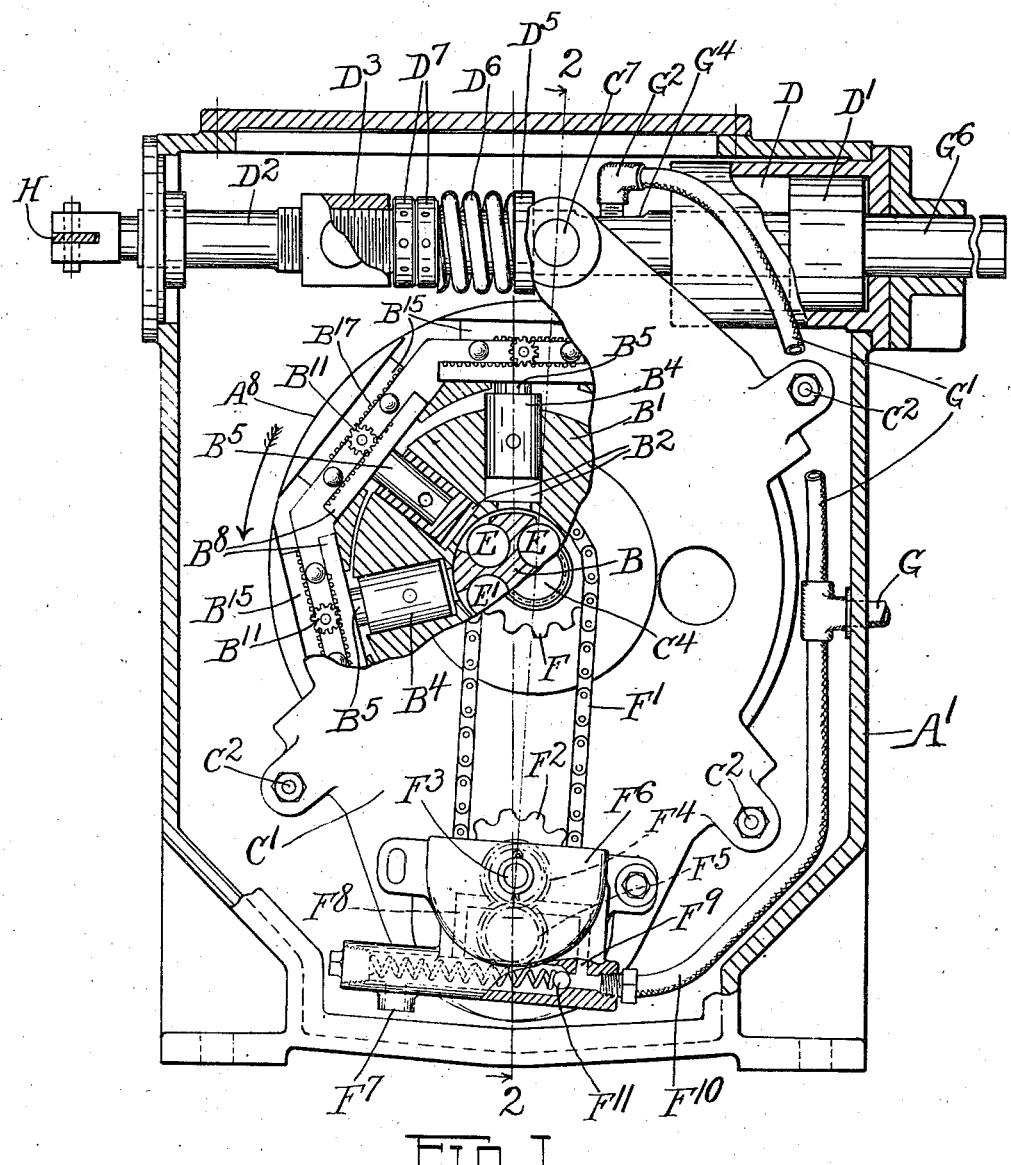
Fig. 1 is a partial end sectional view of the hydraulic transmission constructed in accordance with the present invention, the section being taken substantially along line 1—1 of Fig. 2.

Fig. 9 is a section partly on the broken line 9—9 and partly on the broken line 9—a of Fig. 8; and Fig. 10 is a section along line 10—10 of Fig. 9.

The hydraulic transmission shown is enclosed within a housing which is divided by a partition $A^2$ into a motor compartment A and a pump compartment $A'$. The pump end of the housing is closed by a removable plate $A^3$ and the motor end by a movable plate $A^4$. The cover $A^4$ is fashioned to provide a hub $A^5$ within which is an anti-friction bearing $A^6$ for a shaft $A^7$ driven by the motor. The motor includes a polygonal drum or cage $A'^8$ keyed at its outer end to the shaft $A^7$ and supported at its inner end by an anti-friction bearing $A^9$, carried by a sleeve extension $A^{10}$ of a fixed hub $A^{11}$, constituting an integral part of the partition $A^2$. The axis of the sleeve $A^{10}$ is laterally offset with respect to the axis of the hub $A^{11}$ and coincident with the axis of the shaft $A^7$.

The pump shown is similar to the motor. It also includes a polygonal drum or cage $A^8$ keyed at its outer end to a drive shaft $C^4$ and supported at its inner end upon an anti-friction bearing $C^5$, carried by a hub $C^6$ formed in a cradle $C'$. The cradle $C'$ is disposed in upright position and rockably mounted upon a gudgeon or stub shaft C rigidly anchored in an appropriate boss formed in the partition $A^2$ adjacent the bottom of the housing. The drive shaft is journalled in an anti-friction bearing $C^3$ provided in the cradle $C'$ and projects through the end cover $A^3$ of the housing, so that the shaft $C^4$ and drum $A^8$ may be shifted laterally as a unit, by swinging the cradle upon the gudgeon C. By this adjustment the axis of rotation of the drum may be made to coincide with the axis of the stationary hub $A^{11}$ or displaced laterally to either side thereof. The swinging of the cradle is effected and controlled preferably by mechanism to be hereinafter described connected to pins $C^7$ appropriately mounted in the upper portion of the cradle.

From the foregoing it will be noted that the motor drum $A^8$ is mounted for rotation about a fixed axis permanently offset from the axis of the hub $A^{11}$, whereas the pump drum $A^8$ is mounted for rotation about a laterally adjustable axis whose position is determined by the cradle $C'$. Otherwise however the construction of the pump is substantially identical with that of the motor. Each includes a cylinder barrel $B'$ or $B.'$ disposed within the drum $A^8$ or $A.^8$ and rotatably mounted upon an end of a pintle B. The pintle is firmly fixed within and concentrically of the hub $A^{11}$ so that the axis of rotation of the cylinder barrels are both fixed. Each cylinder barrel contains two parallel series of cylinder bores $B^2$ or $B.^2$ and $B^3$ or $B.^3$. A plunger $B^4$ or $B.^4$ is closely fitted for lengthwise reciprocation in each bore. Each plunger projects radially from its associated cylinder barrel $B'$ or $B.'$ and is connected to the encircling drum $A^8$ or $A.^8$ preferably through mechanism such as shown in detail in Figures 8 and 9.

As indicated in these figures a push pin $B^5$ is loosely engaged within each plunger and retained in assembled relation therewith by a pin $B^6$ projected loosely therethrough. Each pin $B^5$ bears against a convex seat $B^7$ provided in the lower end of the plunger, the arrangement being such as to permit limited play between each push pin and plunger, with a view to eliminating any binding action that might otherwise occur from a slight misalinement of a push pin and plunger. Each pair of parallel push pins are rigidly connected by a cross-head $B^8$, disposed normal thereto. Each cross-head $B^8$ is guided for lengthwise reciprocation between tangential faces $B^9$ formed on the drum and a reaction plate $B^{15}$, removably fixed in appropriate grooves $B^{16}$ formed in the drum, an appropriate anti-friction bearing being interposed between each cross-head and reaction plate. The anti-friction bearing shown comprises two laterally spaced pairs of rollers $B^{13}$ and $B^{14}$ disposed above a push pin $B^5$ of each pair, respectively, and in rolling contact with the opposed faces of the cross-head and reaction plate. The rollers of each pair are journalled in the opposite ends of an appropriate cage $B^{12}$, and a pinion $B^{11}$, journalled in the central portion of the cage, meshes with racks $B^{10}$ and $B^{17}$ formed in the opposed faces of the cross-head and reaction plate, so that the rollers are maintained in proper relation during relative reciprocation between the cross-head and reaction plate. The racks $B^{10}$ and $B^{17}$ are preferably extended to the end of the cross-head and reaction plate, so that the reaction plate may be withdrawn lengthwise of the grooves $B^{16}$ without interference with the pinion.

The mechanism shown for swinging and controlling the position of the cradle $C'$ will now be described. As shown, particularly in Figures 1 and 2 this mechanism includes a hydraulic cylinder D controlling piston $D^1$ and piston rod $D^2$. $D^3$ is a cross-head screw-threaded on the piston rod. $D^4$ $D^4$ are links pivoted on the cross-head and also pivoted on the outer ends of the pins $C^7$. $D^5$ is a washer slidable on the piston rod, and this washer is thrust outwardly against the pins $C^7$ to exert a tension on the links $D^4$ by means of the spring $D^6$ which surrounds the piston rod and reacts against the two check nuts $D^7$ $D^7$, by which the tension on the spring may be controlled so as to set the spring up tight and take out any slack or back lash in the links or cross-head. The mechanism for controlling the hydraulic cylinder will hereafter be described. Suffice it to say that the operation of that cylinder tends to rotate the cradle about the gudgeon pin, and since the cradle carries the pump driver, and since the pump cylinder barrel is mounted on the stationary pintle, a movement of the cradle will tend to displace the axis of the pump driver with respect to the axis of the cylinder barrel and thus change the displacement of the pump. The relation of the parts is such that in the central position the driver and cylinder barrel are coaxial and rotation of the driving shaft $C^4$ does not produce any reciprocation of the plungers with respect to the cylinder barrel, and at this point the displacement of the pump is zero. Any movement of the cradle in either direction from this neutral or dead point will result in changing the eccentricity and thus causing the pump to have a progressively increasing displacement in one direction or the other, depending upon which way the cradle moves.

The pintle B shown contains two pairs of passages E and E'. At any instant the direction of current through these passages may be reversed, but the arrangement is such that when the current moves to the right in the upper passages it moves to the left in the lower, and vice versa. The passages E communicate with ports $E^2$, $E^3$ in the upper side of the pintle adjacent, respectively, to the central plane of the motor and pump cylinder barrels, and the passages $E^1$ communicate with ports $E^4$, $E^5$, respectively, adjacent the center plane of the motor and pump barrels on the lower side of the pintle. These ports $E^2$ $E^4$ and $E^3$ $E^5$, being in the face of the pintle, communicate with the cylinders $B^2$ $B^3$ in the pump and motor cylinder barrels by means of the very short passages or cylinder ports $E^6$, each of which is formed of two cylindrical bores downwardly converging, whose central axes $x$ $x$, $y$ $y$, are inclined to the axes, respectively, of each of the two cylinders of each pair, so that the wall between each of these two cylinders is cut away toward the bottom, forming an oil passage of ample size in each cylinder leading upwardly in V-shape from each of the pintle ports. The divergence of these axes is so determined that cylindrical cutting tools of the size requisite to form the ports may be introduced along the respective port axes, clearing the outer, upper ends of the cylinder bores. The outer walls of said cylinders opposite the points at which the port has cut away the inner walls are chambered out as at $E^7$, removing a surface area on each side approximately equal to the area of cylinder wall removed on the opposite side by cutting the port. This is for the purpose of preventing the possibility of lateral unbalance by pressure of the working fluid against the exposed inner surfaces of the plungers which might otherwise cause binding and wear of the outer surfaces of the cylinder bores.

F is a sprocket on the pump shaft $C^4$. It drives a sprocket chain $F^1$, which chain in turn drives a sprocket $F^2$. This sprocket is mounted on a pump shaft $F^3$. This pump shaft drives an ordinary conventional type of gear pump comprising two gears, $F^4$, $F^5$. These pump gears are mounted in a casing $F^6$, into which oil is drawn through an intake port $F^7$ into and through the intake passage $F^8$ and discharged through a discharge passage $F^9$ into the pressure line $F^{10}$. $F^{11}$ is a spring-seated, adjustable-pressure, relief valve, so arranged that the excess oil pumped by the gear pump, and not required to supply the pressure line, will pass out through the unseated pressure relief valve, to again enter the intake passage $F^8$ and be again circulated through the pump.

The pressure line $F^{10}$ divides into two branches: G, leading back to the system to supply make-up for any oil which may have leaked out, and $G^1$ leading to the stroke-shifting hydraulic cylinder D. The pipe $G^1$ terminates in an elbow $G^2$ which is screwed into the side wall of the hollow valve stem $G^3$ located within the hollow piston rod $D^2$, the piston rod being cut away for a short distance, forming a slot $G^4$, so that the hollow valve stem may reciprocate independently of the piston. $G^5$ is a piston distributing valve reduced or necked down at its center and mounted on the end of the hollow valve stem $G^3$ and fitting closely within a slightly enlarged bore $G^6$ within the piston and piston rod. $G^{10}$ is a radial port in the valve through which oil under pressure, from the interior of the hollow valve stem, may pass out into the annular space $G^7$ surrounding the central portion of the valve. Within the piston are passages $G^8$, $G^9$, one of them leading from the inner side of the piston to the outer edges of the valve, the other from the outer side of the piston to the inner edge of the valve. In the position shown in Fig. 3, both of these passages are closed by the outer and inner lands of the valve, respectively. If the valve as shown in Fig. 3 is moved upwardly, the passage $G^9$ will be brought into communication with the annular pressure space $G^7$ and oil will pass through this passage into the inner end of the cylinder and tend to force the piston to follow the valve until the source of pressure is cut off. At the same time the passage $G^8$ will be brought into communication with the hollow part of the piston rod beyond the valve and the oil or liquid contained within the opposed end of the cylinder will pass out into the space between the hollow valve stem and the piston rod, thence overflowing through the slot $G^4$ into the housing. In the event of movement of the valve in the opposite direction, the opposite operation will take place, because in this case the passage $G^9$ will be opened to the space between the valve stem and piston rod while the passage $G^8$ will conduct oil under pressure to force the piston in the opposite direction to follow up the valve until the ports are brought back into the neutral position.

This valve stem is actuated by a lever H pivoted towards its center on the valve stem. $H^1$ is a link pivoted at one end on one end of the lever H and at the other end on the hand lever $H^2$ working against a quadrant $H^3$ and controlled by a handle $H^4$. If the opposed end of the lever H does not move, then manipulation of the handle $H^4$ will operate the valve. During all normal operations of the machine under hand control the fulcrum end of the lever H removed from the hand control does not move so long as the operator by hand control does not so manipulate the machine as to set up abnormal pressures—that is, pressures of the working fluid in the machine exceeding a predetermined value. However, in order to protect the apparatus, I provide a pressure overload gear, which is calculated, when the operator does so manipulate the device as to generate in the machine pressures above the predetermined limit, to come into operation and automatically so control the machine as to prevent the pressure rising above a certain predetermined point. In general terms, this device commences operation in time to limit the increase in pressure of the working fluid within certain predetermined limits.

K is a piston slidable in a cylinder $K^1$. It carries a piston rod $K^2$ and this piston rod carries a pin $K^3$ slidable in the slot $K^4$ in the lever H. It is this pin $K^3$ which is normally the fulcrum for the lever H. $K^5$ is a spring surrounding the piston rod $K^2$, confined between the floating washer $K^6$ slidable on the piston rod, limited in its downward movement by the shoulder $K^7$, and the yoke $K^8$ adjustable by means of the nut $K^9$ on the piston rod and slidable within a guide tube $K^{10}$. The movement of the washer $K^6$ in a direction toward the cylinder is limited by the stop $K^{11}$, and the movement of the yoke $K^8$ in the opposite direction is limited by the adjustable screw stop $K^{20}$. The piston rod $K^2$ is free to slide through both the washer $K^6$ and yoke $K^8$. The initial tension of spring $K^5$, corresponding to the predetermined pressure at which piston K is to be set to operate, is determined by the position of the nut $K^9$ and screw stop $K^{20}$. The nut $K^9$ is square or polygonal and slidably mounted in a square or polygonal interior of the yoke $K^8$. Adjustment is made by disconnecting the fulcrum pin $K^3$ and withdrawing lever H from the slot in the piston rod $K^2$, whereupon the piston rod may be rotated and the threaded end in engagement with the nut $K^9$ will operate to pull the yoke $K^8$ farther toward the cylinder and further compress the spring. When proper spring tension is reached, the screw stop $K^{20}$ is loosened by means of lock screw $K^{21}$ run in until it again abuts against the outer face of yoke $K^8$ and is again locked in position by the lock screw $K^{21}$. When properly adjusted in any position the spring and associated apparatus rigidly hold the piston K in central position without any back lash whatever. Any movement of the piston in either direction must be accompanied by a further compression of spring, which can only result from a further rise in pressure. During such motion of the overload piston K the pin $H^{14}$ acts as fulcrum for the lever H and motion of the piston K is communicated through the lever H to the valve $G^5$, causing a corresponding movement of the stroke-changing piston $D^1$ in the manner already described covering the operation of this piston by hand-control mechanism, so as to vary the pump displacement in such direction as to limit the increase of pressure from no matter what cause said pressure may originate.

The piston K separates the bore of the overload cylinder $K^1$ into two pressure spaces, $K^{12}$ and $K^{13}$. $K^{12}$ is connected through duct $K^{14}$ and tube $K^{16}$ with a conduit $K^{18}$ formed in web $A^2$ and communicating with passage E. Space $K^{13}$ is connected through duct $K^{15}$ and tube $K^{17}$ with a conduit $K^{19}$ with passages $E^1$. As shown in Fig. 1, the pump shaft is displaced to the right of the axis of pintle B, and with the pump shaft and driver running counter-clockwise, as indicated by the arrow, the pump plungers will be discharging into the upper passages E, which will therefore be high pressure passages so long as the pump is receiving power through the pump shaft and using said power to generate pressure in the working fluid, thereby driving the motor end. Under these conditions, the working fluid discharged by the pump flows through passages E toward the left, as shown in Fig. 2, and enters the upper ports and cylinders of the motor, causing the motor to rotate in the direction of the arrow shown on shaft $A^7$ at the left-hand end of Fig. 3. With the parts in this position, if the motor encounters an excessive resistance to its rotation, causing the pressure to rise unduly in the upper passages E, this pressure will be communicated through conduit $K^{18}$, tube $K^{16}$, duct $K^{14}$ to pressure space $K^{12}$ in the overload cylinder. When said rising pressure has passed a predetermined limit for which spring $K^5$ is adjusted, the piston K will move away from the center line, moving lever H around pin $H^{14}$ as a fulcrum, and thus moving the control valve $G^5$ toward the center line. This will cause the hydraulic piston $D^1$ and associated parts to move toward the center line and thereby reduce the eccentricity and consequently the displacement of the pump so far as may be necessary to reduce the pump delivery and check the rise of working pressure. If necessary, this reduction in pump eccentricity and displacement will continue until the displacement is zero and there is no more fluid pumped.

An excessive rise in fluid pressure in the working circuit may, however, originate from the motor end instead of from the pump end, as just described. This may occur when the motor is driving a load or machine having a large fly-wheel or inertia effect, or when it is driving some machine such as an automobile, which may at times be running down a grade, causing the normal resistance to the motor to entirely disappear and be replaced by conditions which cause the motor to become the driver and convert it into a pump. Under such conditions, with the mechanism in the position just described, the working pressure in passages E (normally caused by the pump) will be converted into a return or exhaust pressure, while the passages $E^1$ will become high pressure passages receiving the working fluid discharged by the motor acting as a pump. Should the driving effort delivered to the motor acting as a pump in turn become excessive, the pressure in passages $E^1$ will rise beyond a predetermined limit and be communicated through conduit $K^{19}$, tube $K^{17}$, duct $K^{15}$ to pressure space $K^{13}$, thereby moving the overload piston K toward the center line, as shown in Fig. 3, and increasing the eccentricity and displacement of the pump beyond the eccentricity shown in Fig. 1. This increase results from moving the center line of pump shaft and driver away from the axis of the pintle, instead of moving them toward the axis of the pintle, which resulted when the rise in pressure originated with the pump driving.

If the cradle, instead of being toward the right, as in Fig. 1, should be thrown to the left, so that the axis of rotation of the driving head is to the left of the axis of rotation of the cylinder barrel, then, without any change in direction of rotation of the pump shaft, the direction of flow of the fluid in the system would be reversed. The lower passages $E^1$ will become the pressure passages, in which fluid will flow from right to left as shown in Fig. 2, returning through the upper passages E from left to right. The motor will be reversed in direction of rotation from that indicated by the arrows drawn on Figs. 2 and 3. Under these circumstances excessive pressures generated by the pump will occur in the lower passages $E^1$ $E^1$ and will communicate through the conduit $K^{19}$, tube $K^{17}$, and duct $K^{15}$ with the pressure chamber $K^{13}$. Should the working pressure under these circumstances rise above a predetermined point at which spring $K^5$ is set to operate, the piston K will be moved toward the center line of the machine, as shown on Fig. 3, thus operating to reduce the stroke of the pump, thus operating the piston valve $G^5$ to cause the hydraulic control to positively and progressively reduce the stroke of the pump until the rise of working pressure is checked. Thus it will be seen that upon whichever side of the center of the machine the axis of the pump shaft may be operating at any moment, the excessive working pressure generated by the pump, above the pressure to which spring $K^5$ is adjusted, will result in reducing the stroke and displacement of the pump until said rise of working pressure is checked.

With the axis of the pump shaft to left of center line of the machine as shown on Fig. 1, and with normal high pressure generated by the pump in passage $E^1$ as just described, should circumstances arise which cause the motor to become the driver and act as a pump, the pressure conditions in passages $E^1$ and E would again be interchanged as in the case previously described, the pressure ports $E^1$ becoming low pressure or return ports and the working pressure caused by the motor acting as a pump would rise in passages E. This working pressure then communicates with the pressure chamber $K^{12}$ through conduit $K^{18}$, tube $K^{16}$, duct $K^{14}$, and should this pressure increase above the limit in pressure to which $K^5$ is adjusted, piston K will be moved away from the center line of the machine, as shown in Fig. 3, carrying with it the valve $G^5$ by means of the lever H and associated parts, as previously described, and thus causing the hydraulic piston $D^1$ to move the center of the pump shaft and driver further away from the axis of the cylinder barrel, thus increasing the displacement of the pump.

It thus appears that for a given direction of rotation of the pump shaft $K^{11}$, and for any position of the cradle either to right or left of the pintle axis, resulting in either right-handed or left-handed rotation of the motor, any conditions whatever which result in a rise of pressure in any part of the working circuit above a predetermined maximum will result in decreasing the displacement of the pump, if the pump is driving, or of increasing the displacement of the pump if the motor is driving. In general, the pump and the motor are identical and interchangeable mechanisms, and the one which at the moment is acting as a generator of pressure in the liquid is, strictly speaking, the pump, and the one in which the liquid pressure is re-converted into mechanical power is, strictly speaking, the motor. Using these designations, the general statement applies that the overload device just described always responds to excessive pressures by decreasing the ratio of displacement of pump to motor. When only one of the two units is provided with stroke changing mechanism, it necessarily follows that when that unit is acting as a pump the overload apparatus acts to reduce its displacement in response to excessive pressure, and when the constant displacement unit is acting as a pump the overload mechanism acts to increase the displacement of the variable displacement unit in order to reduce the ratio stated.

In a sense it may be said that this apparatus is adapted to operate interchangeably as a driving unit or as a brake, because if we are driving an inertia load and the load tends to move faster than the motor at any one time then the whole apparatus, instead of accelerating the load, tends to decelerate—that is, act as a brake—and when it is acting as a brake then the pressure will build up in the system and result in an increase of the ratio of pump displacement with respect to motor displacement if the pressure in the system exceeds a predetermined safe point; otherwise, when acting as a motor or driving apparatus, increase in pressure beyond a predetermined point will result in decreasing the pump displacement with respect to the motor displacement.

L is a relief valve housing mounted on the transmission housing. $L^1$, $L^2$ are passages in the web $A^2$ in line with the passages $K^{18}$, $K^{19}$, and communicating respectively with the passages E, $E^1$. These passages $L^1$, $L^2$ communicate by means of ports $L^3$, $L^4$ with a cylinder $L^5$, in which is mounted for reciprocation a piston valve having three piston heads, $L^6$, $L^7$ and $L^8$, arranged so that the opposed surfaces on $L^6$ and $L^7$ and on $L^7$ and $L^8$ are in hydraulic balance independent of any pressure variations in the passages $L^1$, $L^2$, and the piston valve can stand at rest until moved by some exterior force; so that in the position 1, as shown, with the relief valve closed, the passages L¹ and L² and their associated and connecting passageways are separated by the piston head L⁷. When the piston is thrown into the position 2, as shown in dotted lines, by means which I shall subsequently discuss, the passages L¹ and L² are then in connection through the cylinder L⁵ between the piston heads L⁷ and L⁸, thus short-circuiting the system and permitting the high pressure fluid to flow freely into the low pressure side of the system. This permits the motor end to be rotated by hand, if desired, and also prevents any slight delivery from the pump from causing undesired movement of the motor.

This operation of the piston valve may be obtained either automatically or by hand control. The hand control comprises a lever L⁹ on a shaft L¹⁰. This shaft carries a sleeve L¹¹ forming part of a bell crank comprising a spring lever L¹² and slotted control lever L¹³, the spring lever having anchored thereon a coil spring L¹⁴ anchored on its other end on a pin L¹⁵, the slotted control lever engaging a pin L¹⁶ in a yoke L¹⁷ on the end of the valve stem L¹⁸, the position of the spring lever being such that the spring tension holds the valve firmly either in position 1 or position 2.

The automatic valve control means comprises two passages, M, M¹, communicating respectively with the passages L¹, L². In each one of these passages is mounted for reciprocation a plunger M³ held in the position shown in Fig. 4 by a spring M⁴, thus closing the passages M and M¹. Each of these passages communicates with a vertical duct M⁵ which, in turn, communicates with a transverse duct M⁶ discharging into the cylinder L⁵ above the piston head L⁸, there being a boss M⁷ on the end of the head to leave a chamber into which liquid may pass to exert a pressure on the upper end of the piston valve. If the pressure either in the conduits L¹ or L² exceeds a certain predetermined limit, the plunger will be thrust back, opening the passage and permitting discharge of liquid through the passages M⁵ and M⁶ into the cylinder to throw the valve down against the spring pressure and short-circuit the system, as above suggested. This is an instantaneous operating of the pressure relief mechanism and it is provided because, under some conditions of operation, the operator might conceivably overload his machine so suddenly that the pressure control mechanism above discussed, which works to limit pressures by varying displacement, would not have time to operate. When that is the case, this automatic pressure relief goes into instantaneous operation and the valve is locked in the relief position, thus compelling the operator to notice that he is overloading the machine and compelling him to go around and throw the valve back into the closed position. M⁹ is a bleeder duct smaller than the passage M⁶ and discharging into the housing, so that, after the shut-off, high pressure liquid having thrown the relief valve, the liquid which did that work will be able to leak out and not prevent resetting of the relief valve.

The leakage return is directed into the system from the pipe G through the elbow O, which communicates with a vertical passage O¹ and horizontal passages O², O³. These passages terminate at two spring-seated check valves, O⁴, which valves are located in the passages O⁵, O⁶, these passages being in open communication with the cylinder L⁵ above and below the cylinder head L⁷, respectively, when that head is in the central normal position as shown at I in Fig. 5. Whichever duct, L¹ or L², is the high pressure duct, the ball check valve from that duct will, of course, be locked by the pressure, but the pressure of the leakage return pump will be able to unseat the other check valve enough to permit the inflow of sufficient make-up liquid to keep the system filled with the working fluid.

In Fig. 2 I have shown a clearance between the inner end of the cylinder barrel and the shoulder. Under many conditions this clearance would not be present, because under manufacturing conditions the parts would be so sized that the axial pressure exerted by the closing cap at the end of the housing would tend merely to bring the cylinder barrel up against the shoulder and the lateral or axial adjusting means would then merely be sufficient to compensate for the inaccuracies in manufacture. It will be observed that because the pintle upon which the cylinder barrel is mounted for rotation is tapered there is a component resultant from the radial thrust of the plungers tending to axially displace the cylinder barrel, and the association or relation between the driving head and the plunger cross-heads, or between the driving head and the cylinder barrel, is provided to overcome this axial displacement component.

The shoulder, of course, has no working function when running because the tapered pintle carries the tapered cylinder barrel and the shoulder is merely there to give a definite dimension, the actual diameters of the two parts being such that when the cylinder barrel is brought up to the shoulder and held there by the positioning device, as for instance the driving head, the oil film between the pintle and cylinder barrel will be of the proper thickness. The outward movement of the cylinder barrel is preferably resisted by edged contact of the plates or cross-head B' with one of the faces of the drum A⁸, though for some conditions this resistance might be provided by engagement with the hub of the cylinder barrel against the surface of the drum $A^8$ adjacent the hub where it engages the shaft $A^7$ or $C^4$.

I claim:

1. In a hydraulic machine, a reaction supporting plate mounted for lateral withdrawal across the line of working reaction.

2. In a hydraulic machine, a plurality of radially disposed working members and a plurality of reaction plates associated with them and mounted for lateral withdrawal in a plane perpendicular to the axial line of the working members.

3. In a hydraulic machine, a plurality of radially disposed working members and a plurality of reaction plates associated with them and mounted for lateral withdrawal in a plane perpendicular to the axial line of the working members, the working members being mounted for radial withdrawal when the reaction plate has been laterally withdrawn.

4. In a hydraulic machine, a plurality of radially disposed push pins, cross-heads associated with them, reaction plates parallel with the cross-heads and mounted for removal along a line parallel with the cross-head.

5. In a hydraulic machine, a plurality of radially disposed push pins, cross-heads associated with them, reaction plates parallel with the cross-heads and mounted for removal along lines parallel with the cross-heads and anti-friction bearings between the cross-heads and the reaction plates.

6. In a hydraulic machine, a plurality of radially disposed push pins, cross-heads associated with them, reaction plates parallel with the cross-heads and mounted for removal along lines parallel with the cross-heads, and sliding bearing supports for the cross-heads in opposition to the reaction plates.

7. In a hydraulic machine, a plurality of radially disposed push pins, cross-heads associated with them, reaction plates parallel with the cross-heads and mounted for removal along lines parallel with the cross-heads, anti-friction bearings between the cross-heads and the reaction plates and sliding bearing supports for the cross-heads in opposition to the reaction plates.

8. In a hydraulic machine, a cross-head and a reaction plate, an anti-friction bearing between them, a gear associated with such bearing out of line with the bearing member, and teeth in the opposed faces of the cross-head and reaction member in mesh with said gear.

9. In a hydraulic machine, a cross-head and a reaction plate, an anti-friction bearing between them, a gear associated with such bearing out of line with the bearing member, and teeth in the opposed faces of the cross-head and reaction member in mesh with said gear, said teeth extending clear to the end of cross-head and reaction member on opposed ends.

10. In a hydraulic machine, a cross-head and a reaction plate, an anti-friction bearing between them, a gear associated with such bearing out of line with the bearing member, and teeth in the opposed faces of the cross-head and reaction member in mesh with said gear, said teeth extending clear to the end of cross-head and reaction member on opposed ends whereby lateral separation of the cross-head and reaction member causes the gear to roll from between said members.

11. In a hydraulic machine, two parallel rows of working members, a single cross-head associated with each pair of working members, a reaction plate in line with said cross-head, and rolling bearings interposed between the reaction plate and the cross-head, the bearings being divided into two groups one in line with each working member.

12. In a hydraulic machine, two parallel rows of working members, a single cross-head associated with each pair of working members, a reaction plate in line with said cross-head, rolling bearings interposed between the reaction plate and the cross-head, the bearings being divided into two groups one in line with each working member, and a cage inclosing said bearing members and holding them in position.

13. In a hydraulic machine, two parallel rows of working members, a single cross-head associated with each pair of working members, a reaction plate in line with said cross-head, rolling bearings interposed between the reaction plate and the cross-head, the bearings being divided into two groups one in line with each working member, a cage inclosing said bearing members and holding them in position, and means associated with said cage and engaging the cross-head and reaction plate between the rows of working members for positioning the cage.

14. In a hydraulic machine, two parallel rows of working members, a single cross-head associated with each pair of working members, a reaction plate in line with said cross-head, rolling bearings interposed between the reaction plate and the cross-head, the bearings being divided into two groups one in line with each working member, a cage inclosing said bearing members and holding them in position, and means associated with said cage and engaging the cross-head and reaction plate between the rows of working members for positioning the cage, said means comprising a gear and rack teeth on cross-head and reaction member in mesh with said gear.

15. In a hydraulic machine, two parallel rows of working members, a single crosshead associated with each pair of working members, a reaction plate in line with said cross-head, rolling bearings interposed between the reaction plate and the cross-head, the bearings being divided into two groups one in line with each working member, a cage inclosing said bearing members and holding them in position, and means associated with said cage and engaging the cross-head and reaction plate between the rows of working members for positioning the cage, said means comprising a gear and rack teeth on cross-head and reaction member in mesh with said gear, the reaction member being mounted for lateral withdrawal.

16. In a hydraulic machine, two parallel rows of working members, a single cross-head associated with each pair of working members, a reaction plate in line with said cross-head, rolling bearings interposed between the reaction plate and the cross-head, the bearings being divided into two groups one in line with each working member, a cage inclosing said bearing members and holding them in position, and means associated with said cage and engaging the cross-head and reaction plate between the rows of working members for positioning the cage, said means comprising a gear and rack teeth on cross-head and reaction member in mesh with said gear, the reaction member being mounted for lateral withdrawal, the working member and cross-head being mounted for withdrawal at right angles to the reaction member.

17. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, and a removable reaction plate overlying each polygon face and adapted to hold the cross-head in working position.

18. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, and a removable reaction plate overlying each polygon face and adapted to hold the cross-head in working position, the reaction plate being laterally removable perpendicular to the line of plunger thrust.

19. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, and a removable reaction plate overlying each polygon face and adapted to hold the cross-head in working position, the reaction plate being laterally removable perpendicular to the line of force, the cross-head and plunger being radially withdrawable after the reaction plate has been withdrawn.

20. In a hydraulic machine, a polygonal driving head, a cylinder barrel associated therewith, a cylinder opposite each face of the polygon, a plunger in each cylinder, an opening in each polygon face through which the plunger may be introduced and withdrawn, a cross-head for each plunger guided on the polygonal face, a removable reaction plate overlying each polygon face and adapted to hold the cross-head in working position, and a rolling bearing between the cross-head and the reaction plate.

21. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, a removable reaction plate overlying each polygon face and adapted to hold the cross-head in working position, a rolling bearing between the cross-head and the reaction plate, and means for locating the bearing in working position between them.

22. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, a removable reaction plate overlying each polygon face and adapted to hold the cross-head in working position, a rolling bearing between the cross-head and the reaction plate, and means for locating the bearing in working position between them, said means comprising a pinion, the plate and cross-head being toothed to engage the pinion.

23. In a hydraulic machine, a polygonal driving head, a cylinder barrel associated therewith, a cylinder opposite each face of the polygon, a plunger in each cylinder, a hole in each polygon face through which the plunger may be introduced and withdrawn, a cross-head for each plunger guided on the polygonal face, a removable reaction plate overlying each polygon face and adapted to hold the cross-head in working position, a rolling bearing between the cross-head and the reaction plate, and means for locating the bearing in working position between them, said means comprising a pinion, the plate and cross-head being toothed to engage the pinion, the gear teeth extending to opposite ends of cross-head and reaction plate to permit the lateral withdrawal of the plate and cross-head from register with each other.

24. In a hydraulic machine the combination of two coacting members rotatable about substantially parallel axes, hydraulic connections for one of said members, a shaft connected with the other of said members, and a rockable support for one of said members movable to shift the axis of rotation of said member relative to that of the other member to vary the fluid displacement of the machine.

25. In a hydraulic machine the combination of two coacting members rotatable about substantially parallel axes, hydraulic connections for one of said members, a shaft connected with the other of said members, a rockable support for said last mentioned member movable to shift the axis of rotation thereof relative to that of the other member to vary to fluid displacement of the machine.

26. In a hydraulic machine the combination of two coacting members rotatable about substantially parallel axes, hydraulic connections for one of said members, a shaft connected with the other of said members, an adjustable support for said last mentioned member, and hydraulically actuated means for adjusting said support to vary the fluid displacement of the machine.

27. In a hydraulic machine the combination of two coacting members rotatable about substantially parallel axes, hydraulic connections for one of said members, a shaft connected with the other of said members, an adjustable support for said last named member, an auxiliary fluid pressure source, and means actuated from said source for adjusting said support.

28. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, and removable means associated with each polygon face and overlying the aperture therein for preventing outward movement of the plunger with respect to the polygon.

29. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, a cross-head associated with each plunger and in working engagement with the outer face of each polygon, and removable means associated with each polygon face and overlying the aperture therein for preventing outward movement of the plunger with respect to the polygon.

30. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, and removable means associated with each polygon face and overlying the aperture therein for preventing outward movement of the plunger with respect to the polygon, said means comprising a laterally removable reaction plate.

31. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, a cross-head associated with each plunger and in working engagement with the outer face of each polygon, and removable means associated with each polygon face and overlying the aperture therein for preventing outward movement of the plunger with respect to the polygon, said means comprising a laterally removable reaction plate.

32. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, removable means associated with each polygon face and overlying the aperture therein for preventing outward movement of the plunger with respect to the polygon, said means comprising a laterally removable reaction plate, and slotted flanges associated with the polygon in which the removable plate is held.

33. In a hydraulic machine, a hollow polygonal driving head, a cylinder barrel surrounded thereby, a plurality of cylinders radially disposed in the barrel, a plunger in each cylinder, each face of the polygon being apertured for the insertion and withdrawal thereof, a cross-head associated with each plunger and in working engagement with the outer face of each polygon, removable means associated with each polygon face and overlying the aperture therein for preventing outward movement of the plunger with respect to the polygon, said means comprising a laterally removable reaction plate, and slotted flanges associated with the polygon in which the removable plate is held.

34. In a hydraulic machine, two opposed parallel flanges, radial working members located between said flanges, and a rigid reaction member preventing radial movement of each of said working members comprising a plate supported by said flanges.

35. In a hydraulic machine, two opposed parallel flanges, radial working members located between said flanges, and a rigid reaction member preventing radial movement of each of said working members comprising a plate supported by said flanges, the flanges being slotted to engage the plate.

36. In a hydraulic machine, two opposed parallel flanges, radial working members located between said flanges, and a rigid reaction member preventing radial movement of each of said working members comprising a plate supported by said flanges, the flanges being slotted to engage the plate, the plate being laterally movable within said slots to uncover the working members and permit their radial withdrawal for disassembling.

37. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, and a cross-head associated with said working members adapted for movement parallel with the plane of the reaction member.

38. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, and a rolling bearing between the reaction member and the cross-head.

39. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, and a support for the cross-head in opposition to the reaction member.

40. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, a rolling bearing between the reaction member and the cross-head, and a support for the cross-head in opposition to the reaction member.

41. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, and a two-part support for the cross-head in opposition to the reaction member.

42. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, a rolling bearing between the reaction member and the cross-head, and a two-part support for the cross-head in opposition to the reaction member.

43. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, and a support for the cross-head in opposition to the reaction member, the working member being radially movable for withdrawal through the space between the two parts of the support when the reaction plate has been removed.

44. In a hydraulic machine, two opposed parallel flanges, radial working members located between said flanges, a rigid reaction member preventing radial movement of each of said working members comprising a plate supported by said flanges, the flanges being slotted to engage the plate, the plate being laterally movable within said slots to uncover the working members and permit their radial withdrawal for disassembling, a cross-head associated with said working members adapted for movement parallel with the plane of the reaction member, a rolling bearing between the reaction member and the cross-head, and a support for the cross-head in opposition to the reaction member, the working member being longitudinally movable for withdrawal through the space between the two parts of the support when the reaction plate has been removed.

45. In a hydraulic machine the combination of two rotating members, one of said members having a series of tangential reaction faces, a set of piston and cylinder assemblies between each of said reaction faces and the other of said members, and a cross-head connecting the piston and cylinder assemblies of each set.

46. In a hydraulic machine the combination of two rotary members, one of said members having a series of tangential reaction faces, a plurality of radially disposed piston and cylinder assemblies between said members, comprising a set of substantially parallel piston and cylinder assemblies opposite each of said faces, and a crosshead associated with each of said faces and connecting the piston and cylinder assemblies of a set.

47. In a hydraulic machine the combination of a pintle having a fluid passage therein, a member thereon, a second member surrounding said first named member, a plurality of piston and cylinder assemblies between said members for communication with said passage, said assemblies being arranged in parallel sets, and separate means for connecting the piston and cylinder assemblies of each set.

48. In a hydraulic machine the combination of a pintle having fluid passages therein, a member thereon, a second member surrounding said first named member, a plurality of piston and cylinder assemblies between said members for communication with said passages, said assemblies being arranged in parallel pairs, and connections between the assemblies of each pair.

49. In a hydraulic machine, a cylinder barrel, cylinders arranged in pairs therein, and a common communication port at the inner end of each pair of cylinders.

50. In a hydraulic machine, a cylinder barrel, cylinders arranged in pairs therein, and a common communication port at the inner end of the cylinders, the cylinders themselves being joined toward the lower end as they approach said port.

51. In a hydraulic machine, a cylinder barrel, cylinders arranged in pairs therein, and a common communication port at the inner end of the cylinders, the cylinder walls being cut away between the cylinders of each pair toward the port.

52. In a hydraulic machine, a cylinder barrel, cylinders arranged in pairs therein, and a common communication port at the inner end of the cylinders, the cylinder walls being cut away between the cylinders of each pair toward the port, the wall of the port and the opposed cut-away wall of the cylinder on the same side of the port conforming to an imaginary cylinder inclined to the working cylinder and when extended lying out of contact with the upper edge of the working cylinder.

53. In a hydraulic machine, a cylinder barrel, a pintle upon which it rotates, cylinders in the barrel arranged in pairs, a common port for each pair of cylinders, and a port in the pintle adapted to register with the common cylinder port.

54. In a hydraulic machine, a cylinder barrel, a pintle upon which it rotates, cylinders in the barrel arranged in pairs, a common port for each pair of cylinders, and a port in the pintle adapted to register with the common cylinder port, the wall of the cylinders cut away between the pairs.

55. In a hydraulic machine, a cylinder barrel, a pintle upon which it rotates, cylinders in the barrel arranged in pairs, a common port for each pair of cylinders, and a port in the pintle adapted to register with the common cylinder port, the wall of the cylinders cut away between the pairs, the wall of each cylinder being cut away in opposition to the cut-away portion of the common wall.

56. In a hydraulic machine, a cylinder barrel, a pintle upon which it rotates, cylinders in the barrel arranged in pairs, a common port for each pair of cylinders, and a port in the pintle adapted to register with the common cylinder port, each cylinder having an inclined passage leading to the common port.

57. In a hydraulic machine, a cylinder barrel and a driving head, a two-part cradle for the driving head.

58. In a hydraulic machine, a cylinder barrel and a driving head, a two-part cradle for the driving head, said cradle mounted for rotation about an axis and removed from the axis of rotation of the driving head.

59. In a hydraulic machine, a cylinder barrel and a driving head, a two-part cradle for the driving head, and supporting bearings for the driving head located one in each part.

60. In a hydraulic machine, a cylinder barrel and a driving head, a two-part cradle for the driving head, said cradle mounted for rotation about an axis and removed from the axis of rotation with the driving head, and a supporting bearing for the driving head located one in each part.

61. In a hydraulic machine, two rotating parts, a pintle upon which one is mounted for rotation, a swinging arm upon which the other is mounted for rotation, and means for adjusting the position of the swinging member with respect to the pintle to change the displacement of the machine, said swinging member comprising a cradle surrounding the two rotating parts, there being anti-friction bearings between the swinging member and one of the rotating parts on both sides thereof.

62. In a hydraulic machine, a driving head comprising two parallel flange members, a plurality of opposed parallel tangential grooves therein, and individually removable thrust plates located in said grooves.

63. In a hydraulic machine, a driving head comprising two parallel flange members, a plurality of opposed parallel tangential grooves therein, individually removable thrust plates located in said grooves, and lugs joining said members.

64. In a hydraulic machine, a driving head comprising two parallel flange members, a plurality of opposed parallel tangential grooves therein, individually removable thrust plates located in said grooves, and lugs joining said members, said lugs being located inside the flanges.

65. In a hydraulic machine, a driving head comprising two parallel flange members, a plurality of opposed parallel tangential grooves therein, individually removable thrust plates located in said grooves, and lugs joining said members said lugs having bearing surfaces in opposition to bearing surfaces on the thrust plates.

66. In a hydraulic machine, a driving head comprising two parallel flange members, a plurality of opposed parallel tangential grooves therein, an individually removable thrust plate located in said grooves, lugs joining said members said lugs having bearing surfaces in opposition to bearing surfaces on the thrust plates, and a cross-head guided between said bearing surfaces.

67. In a hydraulic machine, a driving head comprising two parallel flange members, a plurality of opposed parallel tangential grooves therein, a thrust plate located in said grooves, lugs joining said member said lugs having bearing surfaces in opposition to bearing surfaces on the thrust plates, a cross-head guided between said bearing surfaces, and a rolling bearing between the cross-head and the bearing on the thrust plate.

68. In a hydraulic machine, a driving head comprising two parallel flange members, a plurality of opposed parallel tangential grooves therein, a thrust plate located in said grooves, lugs joining said members said lugs having bearing surfaces in opposition to bearing surfaces on the thrust plates, a cross-head guided between said bearing surfaces, and a plunger associated with each cross-head extending inwardly therefrom between said lugs.

69. In a hydraulic machine, a driving head comprising two parallel flange members, a plurality of opposed parallel tangential grooves therein, a thrust plate located in said grooves, lugs joining said members said lugs having bearing surfaces in opposition to bearing surfaces on the thrust plates, a cross-head guided between said bearing surfaces, a rolling bearing between the cross-head and the bearing on the thrust plate, and a plunger associated with each cross-head extending inwardly therefrom between said lugs.

70. In a hydraulic machine, a double flange driving member, a group of radially arranged cylinders between the flanges, a large diameter anti-friction bearing supporting one of the flanges on one side of the cylinders, and smaller anti-friction bearings supporting the other flange on the other side of the cylinders.

71. In a hydraulic machine, two spaced parallel flanges, a radial series of piston and cylinder assemblies having crossheads reciprocable between said flanges, and rigid bars connecting said flanges and underlying said crossheads to retain them in working position.

72. In a hydraulic machine, two parallel flanges, a radially arranged group of cylinders between them, rigid connecting bars extending across between the flanges and overlying the cylinders, the opposed sides of the flanges being slotted, and reaction plates carried in said slots and removable lengthwise thereof, the slots being substantially perpendicular to the axial lines of the respective cylinders.

73. In a hydraulic machine, a series of separate working cylinders, plungers mounted for reciprocation therein and means for supporting and driving said plungers, and reaction means associated with said supporting and driving means, the reaction means and supporting and driving means of any one cylinder being removable independent of all the others.

74. In a hydraulic machine the combination of a driving head comprising two rigidly connected parallel flanges, grooves in the opposed faces thereof, and re-action plates engaged in and supported by said grooves and removable lengthwise therefrom.

75. In a hydraulic machine a driving head comprising two parallel flanges and means for rigidly connecting them, their opposed faces being slotted, a re-action plate supported within said slots, the plate being longitudinally movable in said slots for removal, and means for holding the plate against longitudinal movement.

76. In a hydraulic machine a driving head comprising two parallel flanges and means for rigidly connecting them, their opposed faces being slotted, a re-action plate supported within said slots, the plate being longitudinally movable in said slots for removal, and means for holding the plate against longitudinal movement, a plunger and plunger operating means associated with said re-action plate.

77. In a hydraulic machine a driving head comprising two parallel flanges and means for rigidly connecting them, their opposed faces being slotted, a re-action plate supported within said slots, the plate being longitudinally movable in said slots for removal, and means for holding the plate against longitudinal movement, a plunger and plunger operating means associated with said re-action plate, said means comprising a cross head parallel with the re-action plate and a plunger projecting therefrom.

78. In a hydraulic machine a driving head comprising two parallel flanges and means for rigidly connecting them, their opposed faces being slotted, a re-action plate supported within said slots, the plate being longitudinally movable in said slots for removal, and means for holding the plate against longitudinal movement, a plunger and plunger operating means associated with said re-action plate, said means comprising a cross head parallel with the re-action plate and a plunger projecting therefrom, means for holding the cross head to a path parallel to the re-action plate.

79. In a hydraulic machine a driving head comprising two parallel flanges and means for rigidly connecting them, their opposed faces being slotted, a re-action plate supported within said slots, the plate being longitudinally movable in said slots for removal, and means for holding the plate against longitudinal movement, a plunger and plunger operating means associated with said re-action plate, said means comprising a cross head parallel with the re-action plate and a plunger projecting therefrom, means for holding the cross head to a path parallel to the re-action plate, said means comprising anti-friction bearings between the cross head and the re-action plate and supporting means adapted to hold the cross head in working relation with the anti-friction bearings.

80. In a hydraulic machine a driving head comprising two parallel flanges, means for rigidly connecting them comprising cross bars extending between them, the opposed faces of the flanges being slotted, individually removable re-action plates located within said slots, the cross bars having bearing surfaces opposed to the working surfaces of the re-action plates.

81. In a hydraulic machine a driving head comprising two parallel flanges, means for rigidly connecting them comprising cross bars extending between them, the opposed faces of the flanges being slotted, re-action plates located within said slots, the cross bars having bearing surfaces opposed to the working surfaces of the re-action plates, a cross head adapted for longitudinal movement between the bearing surfaces on the cross bars and the re-action plates.

82. In a hydraulic machine a driving head comprising two parallel flanges, means for rigidly connecting them comprising cross bars extending between them, the opposed faces of the flanges being slotted, re-action plates located within said slots, the cross bars having bearing surfaces opposed to the working surfaces of the re-action plates, a cross head adapted for longitudinal movement between the bearing surfaces on the cross bars and the re-action plates, and an anti-friction bearing between the cross head and the re-action plate.

83. In a hydraulic machine a tapered pintle, a cylinder barrel rotatable thereon, radial plungers mounted for reciprocation in the barrel, a driving head and driving connections between it and the plungers, and means for axially adjusting the position of the driving head to position the barrel on the pintle.

84. In a hydraulic machine a tapered pintle, a cylinder barrel rotatable thereon, radial plungers mounted for reciprocation in the cylinder barrel, and means engaging said plungers, adapted to exert lateral pressure thereon, to axially position the cylinder barrel.

85. In a hydraulic machine a tapered pintle, a cylinder barrel rotatable thereon, radial plungers mounted for reciprocation in the cylinder barrel, and means engaging said plungers, adapted to exert lateral pressure thereon, to axially position the cylinder barrel said means comprising a driving head, means for rotating it and a driving connection between it and the plungers.

86. In a hydraulic machine, a tapered pintle, a cylinder barrel rotatable thereon, radial plungers mounted for reciprocation in the barrel, a driving head associated with said plungers, and a driving connection between the driving head and the plungers, said connection being arranged to axially displace the plungers as the driving head is rotated and to exert a lateral pressure on the plungers independent of rotation to axially adjust the position of the cylinder barrel.

87. In a hydraulic machine a tapered pintle, a cylinder barrel rotatable thereon, radial plungers mounted for reciprocation in the cylinder barrel and a driving head adapted to operate them, means interposed between the driving head and the cylinder barrel for axially positioning the cylinder barrel.

88. In a hydraulic machine, two parallel rows of working members, a single cross-head associated with each pair of working members, a reaction plate in line with said cross-head, rolling bearings interposed between the reaction plate and the cross-head, a cage inclosing said bearing members and holding them in position, and means associated with said cage and engaging the cross-head and reaction plate between the rows of working members for positioning the cage, said means comprising a gear and rack teeth on cross-head and reaction member in mesh with said gear.

89. In a hydraulic machine, two parallel rows of working members, a single cross-head associated with each pair of working members, a reaction plate in line with said cross-head, rolling bearings interposed between the reaction plate and the cross-head, a cage inclosing said bearing members and holding them in position, and means associated with said cage and engaging the cross-head and reaction plate between the rows of working members for positioning the cage, said means comprising a gear and rack teeth on cross-head and reaction member in mesh with said gear, the reaction member being mounted for lateral withdrawal, the working member and cross-head being mounted for withdrawal at right angles to the reaction member.

90. In a hydraulic machine, a cylinder barrel, cylinders therein, a driving head, plungers mounted for reciprocation in said cylinders, cross-heads guided for reciprocation in said head, push pins rigidly mounted on said crossheads and loosely engaging said plungers, and loose pin connections between said push pins and plungers.

91. In a hydraulic machine, a cross-head and a reaction plate, an anti-friction bearing between them, a gear associated with such bearing out of line with the bearing member, and teeth in the opposed faces of the cross-head and reaction member in mesh with said gear, said teeth extending clear to the end of cross-head and reaction member on opposed ends and terminating short of the end of said members on the other end.

92. In a hydraulic machine, a cross-head and a reaction plate, an anti-friction bearing between them, a gear associated with such bearing out of line with the bearing member, and teeth in the opposed faces of the cross-head and reaction member in mesh with said gear, said teeth extending clear to the end of cross-head and reaction member on opposed ends and terminating short of the end of said members on the other end whereby lateral separation of the cross-head and reaction member causes the gear to roll from between said members.

93. In a hydraulic transmission, a hydraulic machine adapted for variable displacement, means for varying said displacement, a control member and a working connection between it and the displacement varying means, and yielding means in said connection adapted to prevent any backlash between the control member and the displacement varying means.

94. In a variable delivery pump, a stroke-changing member, an operating member, a rigid link connection between them, and a yielding member to maintain a non-reversing stress upon the rigid connection.

95. In a hydraulic machine the combination of a plurality of piston and cylinder assemblies, a fluid actuated member for regulating the effective strokes of said piston and cylinder assemblies, fluid passages in said member, and a fluid distributing valve movable in said member and cooperating with said passages to control said member.

96. In a hydraulic machine the combination of a plurality of piston and cylinder assemblies, means including a fluid actuated plunger for regulating the effective strokes of said piston and cylinder assemblies, said plunger having fluid passages, and an element movable lengthwise of said plunger and cooperating with said passages for controlling said plunger.

97. In a variable displacement pump or motor displacement regulating means comprising a fluid actuated plunger having fluid passages, and an element cooperating with said passages for controlling said plunger, said element being movable parallel to the direction of movement of said plunger to determine the extent of movement thereof.

98. In a variable displacement pump or motor the combination of a cylinder, a plunger movable therein to regulate displacement, fluid passages in said plunger, a fluid pressure source, a fluid distributing valve movable in said plunger for controlling said passages, and fluid connections between said valve and said fluid pressure source.

99. In a variable displacement pump or motor the combination of displacement regulating mechanism, an auxiliary pump for supplying an operating fluid to said mechanism, and a fluid distributing valve in open communication with said auxiliary pump for controlling the application of fluid therefrom to said regulating mechanism.

100. The combination with a variable displacement pump or motor, of an auxiliary pump, displacement regulating mechanism actuated solely by fluid delivered from said auxiliary pump, and means for controlling communication between said mechanism and said auxiliary pump to control said mechanism.

101. The combination with a variable displacement pump or motor of a hydraulic circuit connected therewith, means including an auxiliary pump for supplying liquid to said circuit to replenish leakage therefrom, displacement regulating mechanism actuated solely by fluid delivered from said auxiliary pump, and means for controlling communication between said mechanism and said auxiliary pump to control said mechanism.

102. The combination with a variable displacement pump or motor of an auxiliary pump, displacement regulating means including a plunger actuated by fluid delivered by said auxiliary pump, and a fluid distributing valve connected with said pump and movable lengthwise of said plunger for controlling said plunger.

Signed at Chicago, county of Cook and State of Illinois, this 28th day of June, 1921.

WALTER FERRIS.